Feb. 20, 1951  E. J. FARKAS ET AL  2,542,914
SPRAG TYPE OVERRUNNING CLUTCH
Filed Aug. 22, 1945

E. J. Farkas
J. W. Rackle
INVENTOR.

BY Edwin C. McRae
D. C. Harris
Attorneys

Patented Feb. 20, 1951

2,542,914

UNITED STATES PATENT OFFICE 2,542,914

SPRAG TYPE OVERRUNNING CLUTCH

Eugene J. Farkas and Joseph W. Rackle, Detroit, Mich., assignors to Ford Motor Company, Dearborn, Mich., a corporation of Delaware Application August 22, 1945, Serial No. 611,974

1 Claim. (Cl. 192—45.1)

This invention relates to an overrunning or one-way clutch of the type used to connect an inner and an outer coaxial race to transmit rotation between shafts in but one direction.

The purpose of the present invention is to devise a one-way clutch in which the co-operating elements and their activating mechanisms are so arranged as to require a minimum of space without any sacrifice of dependability in operation. Another object is to devise a clutch which may be readily assembled and disassembled with a minimum of difficulty and yet which will be securely maintained in the assembled operating position under all conditions of operation. Still another object is to devise a simplified clutch actuating means which will be positive under all conditions of operation. Another object is to devise a clutch having a minimum number of different parts.

The invention of the present construction requires a minimum of parts and each of the components is of such simplicity as to be susceptible. There are but four different parts on the assembly, and all of them can be formed by simple machine operations and economical manufacture. The association of the elements is such that the assembly and disassembly can be readily accomplished. Moreover, when assembled, the components are securely maintained in place through the co-operation of the several elements. Still another advantage is that the clutch, considering its capacity, is extremely compact and may be used in locations where size is a prime consideration. The clutch is positive in operation and the resilient actuating means—being a simple single coil spring—serves to resist both torsional and direct bending stresses. Other advantages will be readily apparent following the description of the device.

With these and other objects in view, the invention consists in the arrangement, construction and combination of the various parts of the improved device, as described in the specification, claimed in the claim, and shown in the accompanying drawings, in which:

Figure 1:
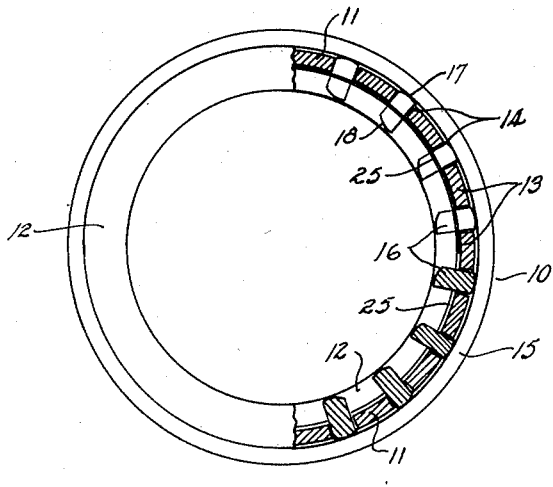
Figure 1 is a view of the assembled clutch, the right-hand portion thereof being shown in section as indicated by the line I—I of Figure 2.
Figure 2:
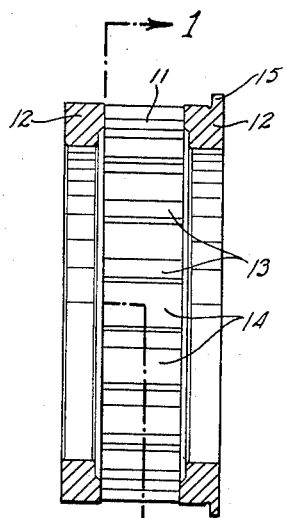
Figure 2 is a diametral transverse section through the cage of the device.

Referring first to Figure 1, the clutch 10 comprises a cage 11 having a pair of spaced rims 12 joined, adjacent their circumference, by a plurality (in this case 18) of radially disposed spacers 13 which form, correspondingly, an equal number of pockets 14. In the present construction, the rims and associated spacers are formed integrally and one of the rims has a piloting flange 15 formed thereon. The sprags 16, or driving members, have opposite driving faces, adapted to engage inner and outer coaxial races, the outer face 17 being concentric with respect to the central axis of the sprag and the inner face 18 being eccentric with respect thereto though the center of curvature falls within the body of the sprag. These sprags are rectangular in plan and each end 19, thereof, is slotted as at 20. This slot is disposed obliquely with respect to the sides 23 and its upper portion 21 (adjacent the outer driving face) is normal to the end of the sprag and is joined by the fillet 24 with the lower portion 22 which is chamfered. The opposite sides 23 of the sprags are parallel and the driving faces 17 and 18, sides 23 and slots 20 are carefully finished by grinding. As shown in Figure 1, the sprags 16 are seated in the individual pockets 14.

Figure 3:
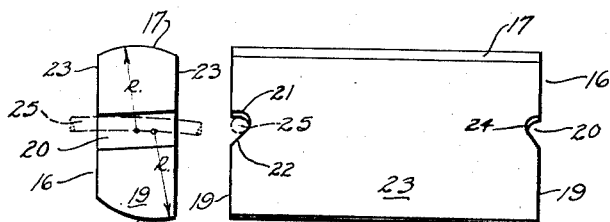
Figures 3 and 4 are an end view and side view, respectively, of the sprag or tiltable driving member.
Figure 4:
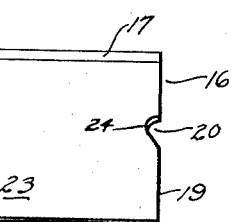
Figure 6:
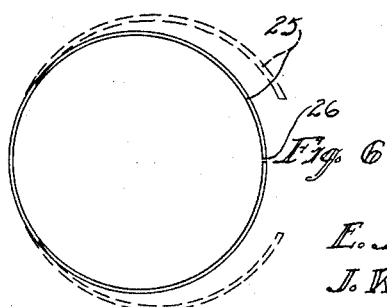
Figure 6 is a plan view, on a reduced scale, of the spring actuating means.
Figure 5:
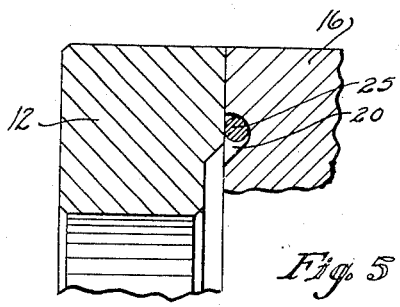
Figure 5 is a view, on an enlarged scale, corresponding to the upper left-hand corner of Figure 2, showing the relationship of the cage and a sprag.

The only other components required for the assembly are a pair of resilient split rings 25 or single coil springs, each of which is preferably formed from a single turn of piano wire—for example, about .03 inch in diameter—and which is intended to be received in the slot 20 of the individual sprags. As shown in Figure 6, in dotted line, the wire is permanently bent into a partial turn having a diameter considerably larger than that represented by the diametral relationship of the slots 21 of the assembled sprags. When the partial turn is compressed to the slot diameter, the opening or free gap 26 between its ends should be as small as possible, consistent with any manufacturing and assembly practice. The width and obliquity of the slots 20 should be chosen so that, in conjunction with the chamfer 22 and the diameter of the spring stock, the spring, when the clutch is engaged, occupies substantially the position shown in dotted line in Figures 3 and 4. There the spring is seated against the normal top position 21 of the slot 20 at the left side of the sprag and as far down on the chamfer 22 as the adjacent rim will permit on the right side. The torsional resistance of the spring—as represented by the difference between the stressed and unstressed positions in Figure 6—urges the individual sprags outwardly into contact with the outer race (though not so far as to free them from the lateral constraint imposed by the rims 12). Moreover, as the sprag tilts in response to speed variation of the two races, the individual portions of the spring seated in the several slots 20 are subjected to direct bending stresses which tend to return the sprags to the position shown. As illustrative of these proportions, the width of the slot should be about twice the diameter of the wire, but these are subject to further variation with the depth of the slot and its obliquity as changes in the angle of the chamfer 22.

The assembly and operation of the device is believed to be clear from the foregoing. The springs 25 are seated in the slots 20 in the ends 19 of the individual sprags 16 and the sprags are seated in the respective pockets. When the clutch is placed within an outer race, the spring is compressed accordingly and the outer faces 17 are resiliently urged into engagement with the race. The sprags 16 are of the usual form and the conformation of the driving faces is such that when reverse rotation occurs, they are tilted out of operative engagement between the inner and outer races which are positioned within the cage 11 and circumferentially disposed about its outer surface, respectively. The spring then restores the drive as soon as the reverse differential in speed is overcome by tilting the sprags back into their proper position. The sprags are centered, resiliently urged into the engagement with the outer race, and resiliently urged into proper radial position through the single agency of the springs. It is, of course, possible to use only one spring, but the arrangement with a spring at each side is much better balanced.

Some changes may be made in the arrangement, construction and combination of the various parts of the improved device, without departing from the spirit of the invention, and it is the intension to cover by the claim, such changes as may be reasonably included within the scope thereof.

The invention claimed is:

A one-way clutch adapted to connect inner and outer coaxial races, comprising a cage having laterally spaced rims and a plurality of circumferentially disposed spacers extending therebetween and defining a plurality of radially extending pockets, a plurality of circumferentially spaced tiltable sprags disposed in the pockets formed between said spacers and extending a substantial distance inwardly of said spacers, arcuate driving faces formed on the inner and outer edges of said sprags, one of said faces being concentric with the longitudinal axis of the sprag and the other being eccentric therewith, transverse slots formed at each end of each sprag with said slots extending obliquely to the sides of the sprag, the radially outer side of each slot extending at right angles to the end face of the sprag and the radially inner side of each slot inclined at an angle to the end face of the sprag with the radially outer and inner sides of each slot being joined by an arcuate surface to form slots generally wedge shaped in cross section, and a radially compressible single wire spring received in the slots at each end of said sprags and confined therein by the adjacent rim, said wire springs being in contact with the outer right angle sides of each slot only adjacent the radially inner end of the oblique slot and in contact with the inclined side of each slot only adjacent the radially outer end of the oblique slot to hold the opposite arcuate faces of said sprags in constant frictional contact with the inner and outer races, said spring being thereby subjected to a transverse bending couple when the sprags are tilted and providing positive control of the sprags at all times.

EUGENE J. FARKAS.
JOSEPH W. RACKLE.

REFERENCES CITED

The following references are of record in the file of this patent:

UNITED STATES PATENTS

| Number | Name | Date |
| --- | --- | --- |
| 1,912,407 | Sahli | June 6, 1933 |
| 2,028,876 | Lotts | Jan. 28, 1936 |
| 2,366,843 | Dodge et al. | Jan. 9, 1945 |
| 2,386,013 | Swenson | Oct. 2, 1945 |
| 2,389,961 | Dodge | Nov. 27, 1945 |
| 2,407,772 | Dodge | Sept. 17, 1946 |
| 2,428,968 | Gruenberg | Oct. 14, 1947 |